United States Patent [19]
Thomas et al.

[11] Patent Number: 5,254,280
[45] Date of Patent: * Oct. 19, 1993

[54] REFRIGERATION COMPOSITIONS HAVING POLYOXYALKYLENE GLYCOLS WITH ALKYLENE GROUPS HAVING AT LEAST 4 CARBON ATOMS THEREIN

[75] Inventors: Raymond H. P. Thomas; David Nalewajek; Hang T. Pham; David P. Wilson, all of Erie, N.Y.

[73] Assignee: AlliedSignal Inc., Morristown, N.J.

[*] Notice: The portion of the term of this patent subsequent to Dec. 4, 2007 has been disclaimed.

[21] Appl. No.: 922,113

[22] Filed: Jul. 28, 1992

Related U.S. Application Data

[63] Continuation-in-part of Ser. No. 614,549, Nov. 16, 1990, Pat. No. 5,154,846, which is a continuation-in-part of Ser. No. 290,120, Dec. 27, 1988, Pat. No. 4,975,212.

[51] Int. Cl.$^5$ .................................................. C09K 5/04
[52] U.S. Cl. .................................... 252/68; 252/52 A; 252/67
[58] Field of Search ......................... 252/67, 68, 52 A

[56] References Cited

U.S. PATENT DOCUMENTS

| | | | |
|---|---|---|---|
| 5,037,570 | 8/1991 | Gorski et al. | 252/68 |
| 5,053,155 | 10/1991 | Mahler | 252/67 |
| 5,100,569 | 3/1992 | Nalewajek et al. | 252/68 |
| 5,154,846 | 10/1992 | Thomas et al. | 252/67 |

FOREIGN PATENT DOCUMENTS 4039394  2/1992  Japan .

Primary Examiner—Ellen M. McAvoy
Attorney, Agent, or Firm—Darryl L. Webster; Melanie L. Brown; Jay P. Friedenson

[57] ABSTRACT

The present invention is directed to polyoxyalkylene glycols which are used to flush currently used lubricants such as mineral oil, alkyl benzenes, and esters from a refrigeration system for conversion to fluorocarbon or hydrofluorocarbon refrigerants. The polyoxyalkylene glycol is selected from the group consisting of polyoxyalkylene glycol which is at least difunctional with respect to hydroxyl groups, polyoxyalkylene glycol having an alkyl cap on one end thereof, and polyoxyalkylene glycol having at least two alkyl caps. The polyoxyalkylene glycol has a molecular weight of about 300 to about 4,000, has a viscosity of about 5 to 150 centistokes at 37° C., and is made from alkylene oxide having at least 4 carbon atoms.

21 Claims, No Drawings

REFRIGERATION COMPOSITIONS HAVING POLYOXYALKYLENE GLYCOLS WITH ALKYLENE GROUPS HAVING AT LEAST 4 CARBON ATOMS THEREIN

This application is a continuation-in-part of Ser. No. 614,549 filed Nov. 16, 1990, now U.S. Pat. No. 5,154,846, which is a continuation-in-part of Ser. No. 290,120 filed Dec. 27, 1988, now U.S. Pat. No. 4,975,212.

BACKGROUND OF THE INVENTION

The present invention relates to novel lubricating compositions and their use with refrigerants. More particularly, the present invention relates to novel lubricating compositions for use with tetrafluoroethane and preferably, 1,1,1,2-tetrafluoroethane (known in the art as R134a). R134a is a refrigerant which may replace dichlorodifluoromethane (known in the art as R12) in many applications because environmental concerns over the use of R12 exist.

R134a has been mentioned as a possible replacement for R12 because concern over potential depletion of the ozone layer exists. R12 is used in closed loop refrigeration systems; many of these systems are automotive air-conditioning systems. R134a has properties similar to those of R12 so that it is possible to substitute R134a for R12 with minimal changes in equipment being required. The symmetrical isomer of R134a is R134 (1,1,2,2-tetrafluoroethane); the isomer is also similar in properties and may also be used. Consequently, it should be understood that in the following discussion, "tetrafluoroethane" will refer to both R134 and R134a.

A unique problem arises in such a substitution. Refrigeration systems which use R-12 generally use mineral oils to lubricate the compressor; the present discussion does not apply to absorption refrigeration equipment. See for example the discussion in Chapter 32 of the 1980 ASHRAE Systems Handbook. R-12 is completely miscible with such oils throughout the entire range of refrigeration system temperatures which may range from about −45.6° to 65.6° C. Consequently, oil which dissolves in the refrigerant travels around the refrigeration loop and generally returns with the refrigerant to the compressor. The oil does not separate during condensation, although it may accumulate because low temperatures exist when the refrigerant is evaporated. At the same time, the oil which lubricates the compressor contains some refrigerant which may affect its lubricating property.

It is known in the industry that chlorodifluoromethane (known in the art as R22) and monochlorodifluoromethane/1-chloro-1,1,2,2,2-pentafluoroethane (known in the art as R502) are not completely miscible in common refrigeration oils. See Downing, FLUOROCARBONS REFRIGERANT HANDBOOK, p. 13. A solution to this problem has been the use of alkylated benzene oils. Such oils are immiscible in R134a and are not useful therewith. This problem is most severe at low temperatures when a separated oil layer would have a very high viscosity. Problems of oil returning to the compressor would be severe.

R134a is not miscible with mineral oils; consequently, different lubricants will be required for use with R134a. However, as mentioned above, no changes to equipment should be necessary when the refrigerant substitution is made. If the lubricant separates from the refrigerant, it is expected that serious operating problems could result. For example, the compressor could be inadequately lubricated if refrigerant replaces the lubricant. Significant problems in other equipment also could result if a lubricant phase separates from the refrigerant during condensation, expansion, or evaporation. These problems are expected to be most serious in automotive air-conditioning systems because the compressors are not separately lubricated and a mixture of refrigerant and lubricant circulates throughout the entire system.

These problems have been recognized generally in the refrigeration art. Two recent publications by ASHRAE suggest that separation of lubricants and refrigerants presents problems, although no mention is made of R134a. These articles are Kruse et al., "Fundamentals of Lubrication in Refrigeration Systems and Heat Pumps," *ASHRAE TRANSACTIONS* 90(2B), 763 (1984) and Spauschus, "Evaluation of Lubricants for Refrigeration and Air-Conditioning Compressors," ibid, 784.

The following discussion will be more readily understood if the mutual solubility of refrigerants and various lubricating oils is considered in general with specific reference to R134a. Small amounts of lubricants may be soluble in R134a over a wide range of temperatures, but as the concentration of the lubricant increases, the temperature range over which complete miscibility occurs, i.e., only one liquid phase is present, narrows substantially. For any composition, two consolute temperatures, i.e., a lower and a higher temperature, may exist. That is, a relatively low temperature below which two distinct liquid phases are present and above which the two phases become miscible and a higher temperature at which the single phase disappears and two phases appear again may exist. A diagram of such a system for R502 refrigerant is shown as FIG. 2 in the Kruse et al. paper mentioned above. A range of temperatures where one phase is present exists and while it would be desirable that a refrigeration system operate within such a range, it has been found that for typical compositions, the miscible range of lubricants with R134a is not wide enough to encompass the typical refrigeration temperatures.

Some disclosures which are concerned with the choice of lubricants when R134a is used as a refrigerant exist. Polyalkylene glycols were suggested to be used in Research Disclosure 17483, October 1978 by DuPont. Specific reference was made to such oils produced by Union Carbide Corporation under the trade names "ULCON" (sic) LB-165 and UCON 525. It is stated that these oils are miscible in all proportions with R134a at temperatures at least as low as −50° C. It is believed that "ULCON" (sic) LB-165 and UCON 525 are polyoxypropylene glycols which have a hydroxy group at one end of each molecule and a n-butyl group at the other end.

The use of synthetic oils for refrigeration systems including polyoxyalkylene glycols is discussed by Sanvordenker et al. in a paper given at a ASHRAE Symposium, Jun. 29, 1972. The authors make the point that polyglycols should properly be called ethers and esters rather than glycols because the terminal hydroxyl groups are bound by ester or ether groups. It is stated that this substitution makes them suitable for lubrication.

U.S. Pat. No. 4,428,854 discloses the use of R134a as an absorption refrigerant where organic solvents are used as absorbing agents. An example is tetraethylene glycol dimethyl ether. A related patent U.S. Pat. No. 4,454,052 also discloses polyethylene glycol methyl ether used as an absorbent along with certain stabilizing materials for refrigerants such as 134a.

Japanese Patent Publication 96684 dated May 30, 1985 addresses the stability problems of refrigerants. The reference teaches that perfluoro ether oligomers are one class of useful lubrication oils.

U.S. Pat. No. 4,267,064 also recommends the use of polyglycol oils, particularly for rotary compressors. It is indicated that viscosities in the range of 25-50 centistokes (CS) at 98.9° C. are needed plus a viscosity index greater than 150. Many refrigerants are mentioned but not tetrafluorethane.

Japanese published application No. 51795 of 1982 relates to antioxidants and corrosion inhibitors for use with various polyether type synthetic oils. The tests were carried out with R-12, which does not exhibit the immiscible character of R134a.

Japanese published patent application 96,684 published May 30, 1985 addresses the stability problems of refrigerants. The reference mentions 12 refrigerants including tetrafluoroethane. The reference also teaches six classes of lubricants including perfluoro ether oligomer, fluorinated silicone, fluorinated oxethane, chlorotrifluoro ethylene polymer, fluorinated polyphenyl ether, and perfluoroamine.

U.S. Pat. No. 4,431,557 relates to additives used in synthetic oils. Many refrigerants are mentioned, but not tetrafluoroethane, and the patentees gave no indication of concern for miscibility of the refrigerants and the lubricants.

Commonly assigned U.S. Pat. No. 4,755,316 teaches a compression refrigeration composition. The refrigerant is tetrafluoroethane while the lubricant is at least one polyoxyalkylene glycol which is at least difunctional with respect to hydroxyl groups, has a molecular weight between 300 and 2,000, has a viscosity of about 25-150 centistokes at 37° C., has a viscosity index of at least 20, and is miscible in combination with the tetrafluoroethane in the range between −40° C. and at least +20° C. The reference does not teach or suggest the present fluorinated lubricating compositions. See also U.S. Pat. No. 4,948,525.

U.K. Patent 1,087,283; U.S. Pat. Nos. 3,483,129; 4,052,277; 4,118,398; 4,379,768; 4,443,349; 4,675,452; 4,827,042; 4,898,991; and 4,931,199; International Publications WO 87/02992 and WO 87/02993; and Kokai Patent Publication 118,598 published May 11, 1989 teach perfluorinated ethers and perfluoropolyethers as lubricants. The references do not teach the present fluorinated lubricating compositions and the references do not teach that their lubricants are useful with R134a. Also, Kokai Patent Publication 146,996, published Jun. 30, 1987, teaches the addition of a perfluoroalkylpolyether as an extreme pressure additive to mineral oil.

Carre, "The Performance of Perfluoropolyalkyether Oils under Boundary Lubrication Conditions", *TRIBOLOGY TRANSACTIONS* 31(4), 437 (1987) and Carre, 1988 Air Force Report discuss the problems of perfluoropolyalkylethers and boundary lubrication in spacecraft.

U.K. Patent 1,354,138 teaches compounds of the formula:

wherein L is —H or —CH$_3$ and z is 0, 1, or 2 on page 1, lines 9-41. As such, the oxyalkylene group can be oxymethylene when z is 0, ethylene oxide when z is 1 and L is —H, straight chain propylene oxide when z is 2 and L is —H, branched propylene oxide when z is 1 and L is —CH$_3$, and branched oxypentylene when z is 2 and L is —CH$_3$. These materials are taught to be useful as surfactants.

U.S. Pat. No. 4,079,084 teaches a compound having a chain of repeating units which may be oxyalkylidine, oxymethylene, oxyalkylene, imino alkylene, or secondary amido chains and at least two terminal perfluorocarbon groups of at least three carbon atoms. For the oxyalkylene unit, the reference teaches ethylene oxide, propylene oxide, or butylene oxide. These materials are taught to be useful as surfactants.

U.S. Pat. No. 2,723,999 teaches compounds of polyethylene glycols or polypropylene glycols. These materials are taught to be useful as surface active agents.

U.S. Pat. No. 4,359,394 teaches that a minor portion of an additive such as a fluorinated aromatic, for example, benzotrifluoride, can be added to a conventional lubricant such as mineral oil. The reference does not teach that a fluorinated aromatic alone is useful as a lubricant.

U.S. Pat. No. 4,944,890 teaches a refrigerant composition of R134a and a copolymer of a fluorinated olefin and nC$_4$H$_9$OCH=CH$_2$.

Because it is expected that R134a will become widely used in the field of refrigeration and air-conditioning, new improved lubricants useful with R134a are needed in the art.

As a result of the aforedescribed problem that mineral oil is immiscible with R134a, the industry faces another problem in the substitution of R134a for R12. Currently used lubricants such as mineral oil and alkyl benzenes should be substantially removed from a refrigeration system before the hydrofluorocarbon refrigerant such as R134a is charged into the system. The traditional solvents or flushing agents used for the removal of the currently used lubricants such as mineral oil, alkyl benzenes, and esters are chlorinated compounds such as trichlorofluoromethane (known in the art as R11) and 1,1,2-trichloro-1,2,2-trifluoroethane (known in the art as R113). Problems occur in using chlorinated compounds with the substitute lubricants developed for use with hydrofluorocarbon refrigerants. The substitute lubricants are chemically incompatible with chlorinated compounds; in particular, small residues of R11 have been identified as being very harmful in a refrigeration system which contains substitute lubricants because decomposition occurs to form hydrogen chloride which is very corrosive. Although compounds such as hexane and acetone have been recommended for use as flushing agents, these compounds are flammable and thus, their use is undesirable. Thus, the need exists in the art for flushing agents which are chemically compatible with the substitute lubricants and nonflammable.

The industry also faces another problem in the substitution of R134a for R12. Upon the conversion of a refrigeration system to R134a and the addition of a substitute lubricant which is miscible with R134a to the system, the industry is concerned that any currently used lubricant such as mineral oil remaining in the system after flushing would be immiscible with the substitute lubricant. If the mineral oil is immiscible with the new lubricant, the mineral oil can accumulate in parts of the refrigeration system and coat heat exchange surfaces. As such, these coated surfaces would be unable to exchange heat efficiently.

If a substitute lubricant was miscible with both R134a and currently used lubricants such as mineral oil, any mineral oil remaining in the system would circulate with the substitute lubricant and the preceding problem would be eliminated. As such, the need exists in the art for a lubricant which is miscible with both a fluorocarbon, hydrochlorofluorocarbon, or hydrofluorocarbon refrigerant such as R134a and currently used lubricants such as mineral oil.

SUMMARY OF THE INVENTION

We have unexpectedly found lubricants that are miscible with both currently used lubricants such as mineral oil, alkyl benzenes, and esters and also with replacement refrigerants such as R134a. the present lubricating compositions comprise a polybutylene glycol having a cap of a fluorinated alkyl group on at least one end thereof. The composition has a molecular weight between about 300 and about 4,000 and a viscosity of about 5 to about 150 centistokes at 37° C. As such, the present invention provides a composition for use in compression refrigeration and air-conditioning comprising: (a) a refrigerant selected from the group consisting of hydrofluorocarbon, hydrochlorofluorocarbon, fluorocarbon, and chlorofluorocarbon; and (b) a sufficient amount to provide lubrication of at least one polybutylene glycol having a cap of a fluorinated alkyl group on at least one end thereof.

Preferably, the novel lubricating composition comprises the formula (I)

wherein m is 4 to 36, n is 0 to 36, $R_2$ is $-C_pH_{2p}O-$ wherein p is 0 to 4, and $R_1$ and $R_3$ are independently selected from the group consisting of hydrogen, alkyl group, and fluorinated alkyl group wherein the ratio of m to n is at least 2. At least one of $R_1$ and $R_3$ is a fluorinated alkyl group. Examples of alkyl groups include methyl, ethyl, n-propyl, isopropyl, n-butyl, sec-butyl, tert-butyl, n-pentyl, isopentyl, neopentyl, and the like. As such, the present lubricating composition may be terminated by a hydrogen at one end and a fluorinated alkyl group at the other end, by an alkyl group at one end and a fluorinated alkyl group at the other end, or by a fluorinated alkyl group at both ends. The fluorinated alkyl group may be branched or straight chain as long as fluorine atoms are attached thereto.

Preferably, n is 0 and m is about 5 to about 25 so that the preferred molecular weight of the lubricant is about 433 to about 1,930.

The present lubricating compositions may be formed by fluorinating polybutylene glycols. The polybutylene glycols used may have primary carbons at both ends, a primary carbon at one end and a secondary carbon at the other end, or secondary carbons at both ends.

In a more preferred embodiment, at least one of $R_1$ and $R_3$ is a fluorinated alkyl group of the formula (II)

wherein x is 1 to 4 and y is 0 to 15. More preferably, x is 1 and y is 0 so that at least one of $R_1$ and $R_3$ is a fluorinated alkyl group of the formula $-CH_2CF_3$ or x is 1 and y is 2 so that at least one of $R_1$ and $R_3$ is a fluorinated alkyl group of the formula $-CH_2(CF_2)_2CF_3$.

Even more preferably, both $R_1$ and $R_3$ are fluorinated alkyl groups and m is 5 to 25.

The most preferred lubricating compositions are

where m is 5 to 25.

Generally, the novel lubricating compositions may be formed by capping a polybutylene glycol with at least one fluorinated alkyl group. For the copolymers, propylene and butylene oxides may be copolymerized and the resulting copolymer may then be terminated with at least one fluorinated alkyl group. Preferably, the novel lubricating compositions wherein one end has an alkyl group and the other end has a fluorinated alkyl group or both ends have fluorinated alkyl groups are formed as follows. The polybutylene glycol is converted to the tosylate by treatment with p-toluenesulfonyl chloride in a suitable base such as pyridine and then the tosylated polyglycol is reacted with the sodium alkoxide of the appropriate fluorinated alcohol.

Preferably, the novel lubricating compositions wherein one end has a hydroxyl group and the other end has a fluorinated alkyl group are formed as follows. An alcohol initiator such as the sodium alkoxide of trifluoroethanol is used in polymerization of polybutylene oxide.

Regarding the known lubricants with which the present lubricants are miscible, mineral oil is paraffin oil or naphthenic and is commercially available. Commercially available alkyl benzene lubricants include Zerol 150 (registered trademark). Commercially available esters include neopentyl glycol dipelargonate which is available as Emery 2917 (registered trademark) and Hatcol 2370 (registered trademark).

The present invention also provides a method for improving lubrication in refrigeration and air-conditioning equipment using a hydrofluorocarbon, hydrochlorofluorocarbon, or fluorocarbon refrigerant. The method comprises the step of: employing a sufficient amount to provide lubrication of at least one polybutylene glycol having a cap of a fluorinated alkyl group on at least one end thereof. The lubricant has a molecular weight of about 300 to about 3,000 and has a viscosity of about 5 to about 150 centistokes at 37° C.

The present invention also provides a lubricating composition comprising a polyoxyalkylene glycol having a cap of a fluorinated alkyl group on at least one end thereof wherein the polyoxyalkylene glycol is formed from copolymer of propylene oxide and butylene oxide and the composition has a molecular weight between about 300 and about 4,000, and a viscosity of about 5 to about 150 centistokes at 37° C. The lubricating composition is miscible with a refrigerant selected from the group consisting of hydrofluorocarbon, hydrochlorofluorocarbon, fluorocarbon, and chlorofluorocarbon.

We have also found lubricants which may be used to flush the currently used lubricants such as mineral oil, alkyl benzenes, and esters from a refrigeration system for conversion to fluorocarbon or hydrofluorocarbon refrigerants such as R134a. The lubricant is selected from the group consisting of polyoxyalkylene glycol which is at least difunctional with respect to hydroxyl groups, polyoxyalkylene glycol having an alkyl cap on at least one end thereof, and polyoxyalkylene glycol having a cap of a fluorinated alkyl group on at least one end thereof. Each polyoxyalkylene glycol has a molecular weight of about 300 to about 4,000, has a viscosity of about 5 to about 150 centistokes at 37° C., and is made from alkylene oxide having at least 4 carbon atoms. Thus, lubricants which are useful as flushing agents are polyoxyalkylene glycol which is at least difunctional with respect to hydroxy groups, polyoxyalkylene glycol having an alkyl cap on one end thereof, polyoxyalkylene glycol having a cap of a fluorinated alkyl group and an alkyl cap, polyoxyalkylene glycol having at least two alkyl caps, polyoxyalkylene glycol having a cap of a fluorinated alkyl group on at least one end thereof, and polyoxyalkylene glycol having at least two fluorinated alkyl caps.

Preferably, the lubricants which are useful as flushing agents are polyoxyalkylene glycol which is at least difunctional with respect to hydroxy groups, polyoxyalkylene glycol having an alkyl cap on one end thereof, polyoxyalkylene glycol having at least two alkyl caps, polyoxyalkylene glycol having a cap of a fluorinated alkyl group on at least one end thereof, polyoxyalkylene glycol having a cap of a fluorinated alkyl group and an alkyl cap, and polyoxyalkylene glycol having at least two fluorinated alkyl caps. The alkyl caps have from 1 to 5 carbon atoms and thus, include methyl, ethyl, n-propyl, isopropyl, n-butyl, sec-butyl, tert-butyl, n-pentyl, isopentyl, and neopentyl. More preferably, the lubricants which are useful as flushing agents are of the Formula (III)

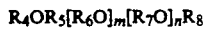

wherein $R_5$ is $-C_pH_{2p}O-$ and p is 0 to 4; $R_4$ and $R_8$ are selected independently from the group consisting of hydrogen, fluorinated alkyl, and alkyl having 1 to 5 carbon atoms; $R_6$ is $-C_aH_{2a}$ and a is 4 to 7; m is 4 to 36; $R_7$ is $-C_bH_{2b}$ and b is 1 to 7 and preferably, 1 to 3; and n is 0 to 36.

The most preferred flushing agents are of the Formula (III) above wherein n is 0 and $R_4$ and $R_8$ are selected independently from the group consisting of hydrogen, fluorinated alkyl, and alkyl having 2 carbon atoms.

In order to flush substantially all of a currently used lubricant out of a refrigeration system, preferably the ratio of flushing agent to lubricant is about 1:99 to about 99:1.

Thus, the present invention provides a composition for use in compression refrigeration and air-conditioning comprising: (a) at least one refrigerant selected from the group consisting of hydrofluorocarbon, hydrochlorofluorocarbon, fluorocarbon, and chlorofluorocarbon; (b) at least one polyoxyalkylene glycol selected from the group consisting of polyoxyalkylene glycol which is at least difunctional with respect to hydroxyl groups, polyoxyalkylene glycol having an alkyl cap on one end, and polyoxyalkylene glycol having at least two alkyl caps wherein said polyoxyalkylene glycol has a molecular weight of about 300 to about 4,000, has a viscosity of about 5 to about 150 centistokes at 37° C., and is made from alkylene oxide having at least 4 carbon atoms; and (c) a lubricant selected from the group consisting of mineral oil, alkyl benzene, and ester.

The following illustrates the use of the present lubricants as flushing agents. After draining most of the currently used lubricant such as mineral oil from a compressor, the present lubricant would then be charged into the compressor. The system would then be operated with a currently used chlorofluorocarbon or hydrochlorofluorocarbon refrigerant such as R22 remaining in the system. Because the present lubricants are miscible with mineral oil, running the compressor in this manner removes substantially all of the mineral oil remaining in the system because the mineral oil is dissolved in the lubricant which is subsequently drained from the compressor. The compressor may then be charged with more of the same present lubricant used as the flushing fluid or a mixture of it and another of the present lubricants and hydrofluorocarbon or fluorocarbon refrigerant.

Thus, the present invention also provides a method of substantially removing lubricant from a refrigeration system. In step (a), at least one polyoxyalkylene glycol is added to the refrigeration system wherein the refrigeration system has chlorofluorocarbon or hydrochlorofluorocarbon refrigerant and lubricant therein. The polyoxyalkylene glycol is selected from the group consisting of polyoxyalkylene glycol which is at least difunctional with respect to hydroxyl groups, polyoxyalkylene glycol having an alkyl cap on one end thereof, and poloxyalkylene glycol having at least two alkyl caps. The polyoxyalkylene glycol has a molecular weight of about 300 to about 4,000, has a viscosity of about 5 to about 150 centistokes at 37° C., and is made from alkylene oxide having at least 4 carbon atoms. In step (b), the refrigeration system is operated so as to substantially remove the lubricant therefrom. Preferably, the lubricant is substantially dissolved in the polyoxyalkylene glycol and the polyoxyalkylene glycol having lubricant dissolved therein is then subsequently drained from the refrigeration system.

Other advantages of the present invention will become apparent from the following description and appended claims.

DETAILED DESCRIPTION OF THE PREFERRED EMBODIMENTS

Refrigerants

The present novel lubricating compositions may be used in most lubricating applications but they are particularly useful with R134a.

The invention relates to the substitution of tetrafluoroethane, and preferably, 1,1,1,2-tetrafluoroethane for R-12 which has been considered to present a danger to the atmospheric ozone layer. R134a has physical characteristics which allow its substitution for R-12 with only a minimum of equipment changes although it is more expensive and unavailable in large quantities at the present time. Its symmetrical isomer, R134, may also be used. The detrimental effect of tetrafluoroethane on atmospheric ozone is considered to be much less than the effect of R-12, and therefore, the substitution of tetrafluoroethane for R-12 is considered probable in the future.

Until R134a becomes available in commercial quantities, it may be produced by any known method including reacting ethylene with carbon having elemental fluorine adsorbed therein as taught by commonly assigned U.S. Pat. No. 4,937,398 which is incorporated herein by reference.

The present lubricants are also suitable for use with R12, R22, R502, methylene fluoride (known in the art as R32), 1-chloro-1,1,2,2-tetrafluoroethane (known in the art as R124a), pentafluoroethane (known in the art as R125), 1-chloro-1,1-difluoroethane (known in the art as R142b), 1,1,1-trifluoroethane (known in the art as 143a), 1,1-difluoroethane (known in the art as R152a), and cycloperfluorobutane (known in the art as RC318). These refrigerants may be used alone or in mixtures thereof in any proportions. However, it should be understood that only blends of refrigerants which are miscible with the lubricants of the invention are included.

Other useful hydrofluorocarbon and fluorocarbon refrigerants include trifluoromethane (known in the art as R23), hexafluoroethane (known in the art as R116), and octafluoropropane (known in the art as R218). A blend of R32 and R125 as taught by commonly assigned U.S. Pat. No. 4,978,467 may also be used in the present invention.

R-12 is used in very large quantities and of the total, a substantial fraction is used for automotive air-conditioning. Consequently, the investigation of the lubricants needed for use with R134a (or R134) has emphasized the requirements of automotive air-conditioning since the temperature range is generally higher than that of other refrigeration systems, i.e., about 0° C. to 93° C. Since it has been found that R134a differs in being much less miscible with common lubricants than R-12, the substitution of refrigerants becomes more difficult.

Lubricants

R-12 is fully miscible in ordinary mineral oils and consequently, separation of the lubricants is not a problem. Although it is similar to R12, R134a is relatively immiscible in many lubricants as may be seen by reference to commonly assigned U.S. Pat. No. 4,755,316. Thus, it is necessary to find suitable lubricants which are miscible with R134a (or R134) to avoid refrigerant and lubricant separation.

It is characteristic of some refrigerant-lubricant mixtures that a temperature exists above which the lubricant separates. Since this phenomenon occurs also at some low temperatures, a limited range of temperatures within which the two fluids are miscible may occur. Ideally, this range should span the operating temperature range in which the refrigerant is to operate, but often this is not possible. It is typical of automotive air-conditioning systems that a significant fraction of the circulating charge is lubricant and the refrigerant and lubricant circulate together through the system. Separation of the lubricant and refrigerant as they return to the compressor could result in erratic lubrication of the moving parts and premature failure. Other air-conditioning system types usually circulate only the relatively smaller amount of lubricant which is carried by the refrigerant gas passing through the compressor and should be less sensitive to the separation problem. Especially with automotive air-conditioning, separation of the relatively large amount of lubricant circulating with the refrigerant can also affect the performance of other parts of the system.

In a typical automotive air-conditioning system, the temperatures at which the refrigerant is condensed originally will be about 50°–70° C. but may reach 90° C. in high ambient temperature operation. The condensation of hot refrigerant gases in the condensing heat exchanger can be affected if the exchanger is coated with lubricant preferentially so that condensation of the refrigerant occurs by contact with the lubricant film. Thereafter, the two-phase mixture of lubricant and refrigerant must pass through a pressure reduction to the low temperature stage where the refrigerant evaporates and absorbs the heat given up in cooling air and condensing moisture. If lubricant separates at the condenser, then the performance of the evaporator stage can be affected if separate phases persist as the two-phase mixture passes through the pressure reduction step. As with the condenser, accumulation of lubricant on the evaporator coils can affect heat exchange efficiency. In addition, the low evaporator temperatures may result in excessive cooling of the lubricant resulting in a more viscous liquid and trapping of the lubricant in the evaporator. These problems can be avoided if the lubricant and the refrigerant are fully miscible throughout the operating temperature ranges, as was true with R-12 and mineral oil mixtures. R134a, with its limited ability to dissolve lubricants, presents a problem which must be solved.

A blend of the present lubricating compositions wherein the compositions have different molecular weights may be used in practicing the present invention. The present polybutylene glycols may also be blended with lubricants of polypropylene glycols which might or might not have a cap of a fluorinated alkyl group on at least one end thereof.

The present lubricating compositions are miscible in combination with the refrigerant at some weight percent from about 1 to about 99 and preferably from about 1 to about 15.

The miscibility is not the only factor to be considered when one is selecting a lubricant for automotive air-conditioning service (or other refrigeration applications). Lubricating properties also must be satisfactory for the intended application. Practically, this means that for automotive air conditioning, the viscosity of the lubricant will be about 5–150 centistokes, preferably about 100 centistokes (CS) at 37° C. with a viscosity index of at least 20 in order that the lubricant is sufficiently viscous at high temperatures to lubricate while remaining sufficiently fluid to circulate around the refrigeration circuit at low temperatures. The range of viscosity may also be expressed as about 3–24 CS at 98.9° C. In addition, the lubricant should be chemically stable and not cause corrosion or other problems in long-term service. Other factors which should be considered in selecting lubricants are compatibility, lubricity, safety, and the like.

Additives which may be used to enhance performance include (1) extreme pressure and antiwear additives, (2) oxidation and thermal stability improvers, (3) corrosion inhibitors, (4) viscosity index improvers, (5) pour and floc point depressants, (6) detergent, (7) anti foaming agents, and (8) viscosity adjusters. Typical members of these classes are listed in TABLE 1 below.

TABLE I

| CLASS ADDITIVE | TYPICAL MEMBERS OF CLASS |
|---|---|
| 1. Extreme Pressure and Antiwear | Phosphates, Phosphate Esters (Bicresyl Phosphate), Phosphites, Thiophosphates (Zinc Diorganodithiophosphates) Chlorinated Waxes, Sulfurized Fats and Olefins, Organic Lead Compounds, Fatty Acids Molybdenum Complexes, Halogen Substituted Organosilicon Compounds, Borates, Organic Esters, |

TABLE I-continued

| CLASS ADDITIVE | TYPICAL MEMBERS OF CLASS |
|---|---|
| | Halogen Substituted Phosphorus Compounds, Sulfurized Diels Alder Adducts, Organic Sulfides, Compounds Containing Chlorine and Sulfur, Metal Salts of Organic Acids |
| 2. Oxidation and Thermal Stability Improvers | Sterically Hindered Phenols (BHT), Aromatic Amines, Dithiophosphates, Phosphites, Sulfides, Metal Salts of Dithio Acids |
| 3. Corrosion Inhibitors | Organic Acids, Organic Amines, Organic Phosphates, Organic Alcohols, Metal Sulfonates, Organic Phosphites |
| 4. Viscosity Index Improvers | Polisobutylene, Polymethacrylate, Polyalkylstyrenes |
| 5. Pour Point and/or Floc Point Depressants | Polymethacrylate Ethylene-Vinyl Acetate Copolymers, Succinamic Acid-Olefin Copolymers, Ethylene-Alpha Olefin Copolymers, Friedel-Crafts Condensation Products of Wax with Naphthalene or Phenols |
| 6. Detergents | Sulfonates, Long-Chain Alkyl Substituted Aromatic Sulfonic Acids, Phosphonates, Thiophosphonates, Phenolates, Metal Salts of Alkyl Phenols, Alkyl Sulfides, Alkylphenol-Aldehyde Condensation Products, Metal Salts of Substituted Salicylates, N-substituted Oligomers or Polymers from the Reaction Products of Unsaturated Anhydrides and Amines, Copolymers of Methacrylates with N-substituted Compounds such as N-vinyl Pyrrolidone or Dimethylaminoethyl Methacrylate, Copolymers which incorporate Polyester Linkages such as Vinyl Acetate-Maleic Anhydride Copolymers |
| 7. Anti-Foaming Agents | Silicone Polymers |
| 8. Viscosity Adjusters | Polyisobutylene, Polymethacrylates, Polyalkylstyrenes, Naphthenic Oils, Alkylbenzene Oils, Paraffinic Oils, Polyesters, Polyvinylchloride, Polyphosphates |

The present invention is more fully illustrated by the following non-limiting Examples.

COMPARATIVES

These Comparatives demonstrate that currently used lubricants are immiscible with R134a. In the following Table 2, Winsor Lube L245X (registered trademark) is a mineral sold by Anderson Oil and Chemical. Zerol 150 (registered trademark) is an alkyl benzene oil sold by Shrieve Chemical. Krytox 143AB (registered trademark) is a homopolymer of hexafluoropropylene epoxide, has a molecular weight of 3700, and is commercially available from du Pont. The results indicate that mineral oils and alkyl benzenes are immiscible with R134a even at low concentrations of oil in refrigerant. In any refrigeration and air-conditioning system, this creates a serious problem for oil return to the compressor.

TABLE 2

| LUBRICANT | VISCOSITY AT 37° C. | WEIGHT PERCENT LUBRICANT | MISCIBILITY (°C.) |
|---|---|---|---|
| Zerol 150 ® | 32 | 2 | immiscible at room temperature |
| Zerol 150 ® | 32 | 0.5 | immiscible at room temperature |
| Winsor L245X ® | 32 | 2.25 | immiscible at room temperature |
| Winsor L245X ® | 32 | 0.54 | immiscible at room temperature |
| Krytox 143AB ® | — | — | immiscible |

EXAMPLES 1-6

Examples 1-6 are directed to the preparation of lubricants useful in the present invention.

EXAMPLE 1

This Example was directed to the preparation of bis-trifluoroethyl(polybutylene glycol) which has the formula $CF_3CH_2O[C_4H_8O]_mCH_2CF_3$ where m is 9. The molecular weight of this lubricant is 849.

Polybutylene glycol of molecular weight 685 (1 kilogram, 1.46 moles) was dissolved in pyridine (2 kilograms, 2.5 moles) and cooled to 0° C.; p-Toluenesulfonyl chloride (0.62 kilogram, 3.25 moles) was added at a rate to keep the internal temperature at or below 15° C. After the addition was complete, the reaction was maintained at this temperature for 4 hours to complete the formation of the dimesylate of polybutylene glycol. The reaction mixture was then quenched in water (6 kilograms, 333 moles.)

The product was extracted from the pyridine water solution by extracting the mixture with 6 liters of butylether. The ether solution was washed with 10N hydrochloric acid (4 liters) and finally 14N ammonium hydroxide (3 liters). The ether layer was dried over sodium sulfate (0.25 kilogram) and then filtered. The resulting butylether-product solution contained 1.34 kilograms of ditosylate representing a yield of 92%.

The final product was prepared by reacting the dimesylate with sodium trifluoroethylate (0.39 kilogram, 3.2 moles) in the butylether solution at 90° C. for 8 hours. The precipitated sodium tosylate was removed by filtration. The resulting ether solution was washed successively with 3% sodium hydroxide (2 L), 6N hydrochloric acid (2 liters) and saturated sodium carbonate solution (1 liter). After drying over sodium sulfate (0.25 kilogram), the final product was isolated by removing the butylether by distillation. The final product was isolated as a colorless oil (1.16 kilogram, 90%).

EXAMPLE 2

This Example was directed to the preparation of the bis-trifluoroethyl(polybutylene glycol) of Example 1 wherein m is 14. The material was prepared according to Example 1 except that the molecular weight of the starting polybutylene glycol was 1059. The molecular weight of the lubricant is 1225.

EXAMPLE 3

This Example was directed to the preparation of the bis-trifluoroethyl(polybutylene glycol) of Example 1 wherein m is 19. The material was prepared according to Example 1 except that the molecular weight of the starting polybutylene glycol was 1385. The molecular weight of the lubricant is 1549.

EXAMPLE 4

This Example is directed to the preparation of the lubricant of the formula $$CF_3(CF_2)_2CH_2O[C_4H_8O]_mCH_2(CF_2)_2CF_3$$

wherein m is 9. The material is prepared according to Example 1 except that the sodium salt of 1H, 1H-perfluorobutanol is used as the capping alkoxide rather than the sodium salt of trifluoroethanol. The molecular weight of the lubricant is 909.

EXAMPLE 5

This Example is directed to the preparation of the novel lubricating composition of Example 4, except that m is 14. The molecular weight of the lubricant is 1283.

EXAMPLE 6

This Example is directed to the preparation of the novel lubricating composition of Example 4, except that m is 19. The molecular weight of the lubricant is 1609.

EXAMPLE 7

The miscibility of the lubricating composition of Example 1 was determined by combining it with refrigerant in a glass tube and observing the results when the tubes were maintained at preselected temperatures. A tube was filled with the desired amount of lubricant and then refrigerant was added while the oil was frozen in liquid nitrogen. The tube was then sealed and immersed in a thermostated bath. After the temperature was equilibrated, the miscibility of the lubricant and refrigerant was determined by visual observation. The results of the tests made with R-134a are shown below.

| LUBRICANT | VISC (cs) | MW | EX WT % GLY | MISC (°C.) |
|---|---|---|---|---|
| Example 1 | 29 | 851 | 15.4 | −42 to >75 |
| Example 2 | 29 | 851 | 5 | −54 to >75 |
| Example 3 | 60 | 1225 | 5 | −4 to 57 |

Both lubricant/refrigerant mixtures remained clear at the temperatures indicated.

EXAMPLES 8-59

The following lubricants are combined with each of R134a, R12, R22, and R502 and the miscibility is determined as described in Example 7 above. MW stands for molecular weight. Each lubricant exhibits satisfactory miscibility with each refrigerant.

| EX | LUBRICANT | MW |
|---|---|---|
| 8 | HO—[C$_4$H$_8$O]$_4$—CH$_2$CF$_3$ | 388 |
| 9 | HO—[C$_4$H$_8$O]$_8$—CH$_2$CF$_3$ | 676 |
| 10 | HO—[C$_4$H$_8$O]$_{12}$—CH$_2$CF$_3$ | 964 |
| 11 | HO—[C$_4$H$_8$O]$_{16}$—CH$_2$CF$_3$ | 1,252 |
| 12 | HO—[C$_4$H$_8$O]$_5$—CH$_2$C$_3$F$_7$ | 560 |
| 13 | HO—[C$_4$H$_8$O]$_9$—CH$_2$C$_3$F$_7$ | 848 |
| 14 | HO—[C$_4$H$_8$O]$_{13}$—CH$_2$C$_3$F$_7$ | 1,136 |
| 15 | HO—[C$_4$H$_8$O]$_{17}$—CH$_2$C$_3$F$_7$ | 1,424 |
| 16 | CH$_3$O—[C$_4$H$_8$O]$_{22}$—CH$_2$CF$_3$ | 1,698 |
| 17 | CH$_3$O—[C$_4$H$_8$O]$_{26}$—CH$_2$CF$_3$ | 1,986 |
| 18 | CH$_3$O—[C$_4$H$_8$O]$_{30}$—CH$_2$CF$_3$ | 2,274 |
| 19 | CH$_3$O—[C$_4$H$_8$O]$_{34}$—CH$_2$CF$_3$ | 2,562 |
| 20 | CH$_3$O—[C$_4$H$_8$O]$_{21}$—CH$_2$C$_3$F$_7$ | 1,726 |
| 21 | CH$_3$O—[C$_4$H$_8$O]$_{25}$—CH$_2$C$_3$F$_7$ | 2,014 |
| 22 | CH$_3$O—[C$_4$H$_8$O]$_{29}$—CH$_2$C$_3$F$_7$ | 2,302 |
| 23 | CH$_3$O—[C$_4$H$_8$O]$_{33}$—CH$_2$C$_3$F$_7$ | 2,590 |
| 24 | C$_2$H$_5$O—[C$_4$H$_8$O]$_{23}$—CH$_2$CF$_3$ | 1,784 |
| 25 | C$_2$H$_5$O—[C$_4$H$_8$O]$_{27}$—CH$_2$CF$_3$ | 2,072 |
| 26 | C$_2$H$_5$O—[C$_4$H$_8$O]$_{31}$—CH$_2$CF$_3$ | 2,360 |
| 27 | C$_2$H$_5$O—[C$_4$H$_8$O]$_{35}$—CH$_2$CF$_3$ | 2,648 |
| 28 | C$_2$H$_5$O—[C$_4$H$_8$O]$_{24}$—CH$_2$C$_3$F$_7$ | 1,956 |
| 29 | C$_2$H$_5$O—[C$_4$H$_8$O]$_{28}$—CH$_2$C$_3$F$_7$ | 2,244 |
| 30 | C$_2$H$_5$O—[C$_4$H$_8$O]$_{32}$—CH$_2$C$_3$F$_7$ | 2,532 |
| 31 | C$_2$H$_5$O—[C$_4$H$_8$O]$_{36}$—CH$_2$C$_3$F$_7$ | 2,820 |
| 32 | C$_3$H$_7$O—[C$_4$H$_8$O]$_{25}$—CH$_2$CF$_3$ | 1,942 |
| 33 | C$_2$H$_7$O—[C$_4$H$_8$O]$_{29}$—CH$_2$CF$_3$ | 2,230 |
| 34 | C$_3$H$_7$O—[C$_4$H$_8$O]$_{33}$—CH$_2$CF$_3$ | 2,518 |
| 35 | C$_3$H$_7$O—[C$_4$H$_8$O]$_{36}$—CH$_2$CF$_3$ | 2,734 |
| 36 | C$_3$H$_7$O—[C$_4$H$_8$O]$_{36}$—CH$_2$C$_3$F$_7$ | 2,114 |
| 37 | C$_3$H$_7$O—[C$_4$H$_8$O]$_{30}$—CH$_2$C$_3$F$_7$ | 2,402 |
| 38 | C$_3$H$_7$O—[C$_4$H$_8$O]$_{34}$—CH$_2$C$_3$F$_7$ | 2,690 |
| 39 | C$_3$H$_7$O—[C$_4$H$_8$O]$_{36}$—CH$_2$C$_3$F$_7$ | 2,834 |
| 40 | C$_4$H$_9$O—[C$_4$H$_8$O]$_{27}$—CH$_2$CF$_3$ | 2,100 |
| 41 | C$_4$H$_9$O—[C$_4$H$_8$O]$_{31}$—CH$_2$CF$_3$ | 2,388 |
| 42 | C$_4$H$_9$O—[C$_4$H$_8$O]$_{35}$—CH$_2$CF$_3$ | 2,676 |
| 43 | C$_4$H$_9$O—[C$_4$H$_8$O]$_{36}$—CH$_2$CF$_3$ | 2,748 |
| 44 | C$_4$H$_9$O—[C$_4$H$_8$O]$_{28}$—CH$_2$C$_3$F$_7$ | 2,272 |
| 45 | C$_4$H$_9$O—[C$_4$H$_8$O]$_{32}$—CH$_2$C$_3$F$_7$ | 2,560 |
| 46 | C$_4$H$_9$O—[C$_4$H$_8$O]$_{36}$—CH$_2$C$_3$F$_7$ | 2,848 |
| 47 | C$_4$H$_9$O—[C$_4$H$_8$O]$_{24}$—CH$_2$C$_3$F$_7$ | 1,984 |
| 48 | F$_4$CH$_2$CO—[C$_4$H$_8$O]$_7$—CH$_2$CF$_3$ | 686 |
| 49 | F$_3$CH$_2$CO—[C$_4$H$_8$O]$_{11}$—CH$_2$CF$_3$ | 974 |
| 50 | F$_3$CH$_2$CO—[C$_4$H$_8$O]$_{15}$—CH$_2$CF$_3$ | 1,262 |
| 51 | F$_3$CH$_2$CO—[C$_4$H$_8$O]$_{19}$—CH$_2$CF$_3$ | 1,550 |
| 52 | F$_7$C$_3$H$_2$CO—[C$_4$H$_8$O]$_{23}$—CH$_2$C$_3$F$_7$ | 2,038 |
| 53 | F$_7$C$_3$H$_2$CO—[C$_4$H$_8$O]$_{27}$—CH$_2$C$_3$F$_7$ | 2,326 |
| 54 | F$_7$C$_3$H$_2$CO—[C$_4$H$_8$O]$_{31}$—CH$_2$C$_3$F$_7$ | 2,614 |
| 55 | F$_7$C$_3$H$_2$CO—[C$_4$H$_8$O]$_{36}$—CH$_2$C$_3$F$_7$ | 2,974 |
| 56 | F$_3$CH$_2$CO—[C$_4$H$_8$O]$_8$—CH$_2$C$_3$F$_7$ | 858 |
| 57 | F$_3$CH$_2$CO—[C$_4$H$_8$O]$_{12}$—CH$_2$C$_3$F$_7$ | 1,146 |
| 58 | F$_3$CH$_2$CO—[C$_4$H$_8$O]$_{16}$—CH$_2$C$_3$F$_7$ | 1,434 |
| 59 | F$_3$CH$_2$CO—[C$_4$H$_8$O]$_{20}$—CH$_2$C$_3$F$_7$ | 1,722 |

EXAMPLE 60

This Example demonstrates that the present fluorinated polybutylene glycol lubricants are miscible with currently used lubricants such as mineral oils, alkyl benzenes, and esters. Sunoco 3GS (registered trademark) is a mineral oil which is commercially available from Witco. Zerol 150 (registered trademark) is an alkyl benzene oil which is commercially available from Shrieve Chemical. Emery 2930-A (registered trademark) is an ester lubricant which is commercially available from Emery. These lubricants were mixed in various proportions with the fluorinated polybutylene glycol of Example 1. The mixtures remained clear and were one phase.

| PRESENT LUBRICANT | KNOWN LUBRICANT | RESULT |
|---|---|---|
| Example 1 | Sunoco 3GS ® | Clear, one phase mixture. |
| Example 1 | Zerol 150 ® | Clear, one phase mixture. |
| Example 1 | Emery 2930-A ® | Clear, one phase mixture. |

EXAMPLES 61-112

Each lubricant of Examples 1-6 and 8-59 is combined with each of the following known lubricants: mineral oil and alkyl benzene. Each mixture remains clear and is one phase.

EXAMPLE 113

One test commonly used in determining the performance of the lubricant is a Falex wear test. The test used here is described in the ASHRAE Journal, June 1969, pages 85-89 by D. F. Huttenlocher. The test was modified. The wear in was done at 100 pounds for five minutes. The test was then run at a constant load of 400 pounds for one hour. The speed of rotation of the pin was constant at 450 rpm. Before the test, HFC-134a was bubbled through the lubricant in order to saturate it. During the test, the refrigerant was bubbled through the refrigerant at a rate of 10 cc per minute in order to maintain saturation. The wear is measured by noting the decrease in mass of the pin or in teeth. The lubricity was good.

EXAMPLES 114-165

The following lubricants are combined with each of R134a, R12, R22, R125, R143a, R32, R123, R123a, and R502 and the miscibility is determined as described in Example 7 above. MW stands for molecular weight. Each lubricant exhibits satisfactory miscibility with each refrigerant.

| EX | LUBRICANT | MW |
|---|---|---|
| 114 | HO[$C_4H_8O$]$_4$[$C_3H_6O$]$CH_2CF_3$ | 446 |
| 115 | HO[$C_4H_8O$]$_8$[$C_3H_6O$]$CH_2CF_3$ | 734 |
| 116 | HO[$C_4H_8O$]$_{12}$[$C_3H_6O$]$CH_2CF_3$ | 1,022 |
| 117 | HO[$C_4H_8O$]$_{16}$[$C_3H_6O$]$CH_2CF_3$ | 1,310 |
| 118 | HO[$C_4H_8O$]$_5$[$C_3H_6O$]$CH_2C_3F_7$ | 618 |
| 119 | HO[$C_4H_8O$]$_9$[$C_3H_6O$]$CH_2C_3F_7$ | 906 |
| 120 | HO[$C_4H_8O$]$_{13}$[$C_3H_6O$]$CH_2C_3F_7$ | 1,194 |
| 121 | HO[$C_4H_8O$]$_{17}$[$C_3H_6O$]$CH_2C_3F_7$ | 1,482 |
| 122 | HO[$C_4H_8O$]$_{20}$[$C_3H_6O$]$CH_2CF_3$ | 1,598 |
| 123 | HO[$C_4H_8O$]$_{24}$[$C_3H_6O$]$CH_2CF_3$ | 1,886 |
| 124 | HO[$C_4H_8O$]$_{28}$[$C_3H_6O$]$CH_2CF_3$ | 2,174 |
| 125 | HO[$C_4H_8O$]$_{32}$[$C_3H_6O$]$CH_2CF_3$ | 2,462 |
| 126 | HO[$C_4H_8O$]$_4$[$C_3H_6O$]$CH_2C_3F_7$ | 546 |
| 127 | HO[$C_4H_8O$]$_8$[$C_3H_6O$]$CH_2C_3F_7$ | 834 |
| 128 | HO[$C_4H_8O$]$_{12}$[$C_3H_6O$]$CH_2C_3F_7$ | 1,122 |
| 129 | HO[$C_4H_8O$]$_{16}$[$C_3H_6O$]$CH_2C_3F_7$ | 1,410 |
| 130 | $CH_3O$[$C_4H_8O$]$_5$[$C_3H_6O$]$CH_2CF_3$ | 532 |
| 131 | $CH_3O$[$C_4H_8O$]$_9$[$C_3H_6O$]$CH_2CF_3$ | 820 |
| 132 | $CH_3O$[$C_4H_8O$]$_{13}$[$C_3H_6O$]$CH_2CF_3$ | 1,108 |
| 133 | $CH_3O$[$C_4H_8O$]$_{17}$[$C_3H_6O$]$CH_2CF_3$ | 1,396 |
| 134 | $CH_3O$[$C_4H_8O$]$_6$[$C_3H_6O$]$CH_2C_3F_7$ | 704 |
| 135 | $CH_3O$[$C_4H_8O$]$_{10}$[$C_3H_6O$]$CH_2C_3F_7$ | 992 |
| 136 | $CH_3O$[$C_4H_8O$]$_{14}$[$C_3H_6O$]$CH_2C_3F_7$ | 1,280 |
| 137 | $CH_3O$[$C_4H_8O$]$_{18}$[$C_3H_6O$]$CH_2C_3F_7$ | 1,658 |
| 138 | $C_2H_5O$[$C_4H_8O$]$_7$[$C_3H_6O$]$CH_2CF_3$ | 690 |
| 139 | $C_2H_5O$[$C_4H_8O$]$_{11}$[$C_3H_6O$]$CH_2C_3F_7$ | 978 |
| 140 | $C_2H_5O$[$C_4H_8O$]$_{15}$[$C_3H_6O$]$CH_2C_3F_7$ | 1,266 |
| 141 | $C_2H_5O$[$C_4H_8O$]$_{19}$[$C_3H_6O$]$CH_2C_3F_7$ | 1,554 |
| 142 | $C_2H_5O$[$C_4H_8O$]$_8$[$C_3H_6O$]$CH_2C_3F_7$ | 862 |
| 143 | $C_2H_5O$[$C_4H_8O$]$_{12}$[$C_3H_6O$]$CH_2C_3F_7$ | 1,150 |
| 144 | $C_2H_5O$[$C_4H_8O$]$_{16}$[$C_3H_6O$]$CH_2C_3F_7$ | 1,438 |
| 145 | $C_2H_5O$[$C_4H_8O$]$_{20}$[$C_3H_6O$]$CH_2C_3F_7$ | 1,726 |
| 146 | $C_3H_7O$[$C_4H_8O$]$_9$[$C_3H_6O$]$CH_2CF_3$ | 848 |
| 147 | $C_3H_7O$[$C_4H_8O$]$_{13}$[$C_3H_6O$]$CH_2CF_3$ | 1,136 |
| 148 | $C_3H_7O$[$C_4H_8O$]$_{17}$[$C_3H_6O$]$CH_2CF_3$ | 1,424 |
| 149 | $C_3H_7O$[$C_4H_8O$]$_{21}$[$C_3H_6O$]$CH_2CF_3$ | 1,712 |
| 150 | $C_3H_7O$[$C_4H_8O$]$_{10}$[$C_3H_6O$]$CH_2C_3F_7$ | 1,020 |
| 151 | $C_3H_7O$[$C_4H_8O$]$_{14}$[$C_3H_6O$]$CH_2C_3F_7$ | 1,308 |
| 152 | $C_3H_7O$[$C_4H_8O$]$_{18}$[$C_3H_6O$]$CH_2C_3F_7$ | 1,596 |
| 153 | $C_3H_7O$[$C_4H_8O$]$_{22}$[$C_3H_6O$]$CH_2C_3F_7$ | 1,884 |
| 154 | $C_4H_9O$[$C_4H_8O$]$_{11}$[$C_3H_6O$]$CH_2CF_3$ | 1,006 |
| 155 | $C_4H_9O$[$C_4H_8O$]$_{15}$[$C_3H_6O$]$CH_2CF_3$ | 1,294 |
| 156 | $C_4H_9O$[$C_4H_8O$]$_{19}$[$C_3H_6O$]$CH_2CF_3$ | 1,582 |
| 157 | $C_4H_9O$[$C_4H_8O$]$_{23}$[$C_3H_6O$]$CH_2CF_3$ | 1,870 |
| 158 | $C_4H_9O$[$C_4H_8O$]$_{12}$[$C_3H_6O$]$CH_2C_3F_7$ | 1,058 |
| 159 | $C_4H_9$[$C_4H_8O$]$_{16}$[$C_3H_6O$]$CH_2C_3F_7$ | 1,466 |
| 160 | $C_4H_9O$[$C_4H_8O$]$_{20}$[$C_3H_6O$]$CH_2C_3F_7$ | 1,754 |
| 161 | $C_4H_9O$[$C_4H_8O$]$_{24}$[$C_3H_6O$]$CH_2C_3F_7$ | 2,042 |
| 162 | $F_3CH_2CO$[$C_4H_8O$]$_{13}$[$C_3H_6O$]$CH_2CF_3$ | 1,176 |
| 163 | $F_3CH_2CO$[$C_4H_8O$]$_{17}$[$C_3H_6O$]$CH_2CF_3$ | 1,464 |
| 164 | $F_3CH_2CO$[$C_4H_8O$]$_{21}$[$C_3H_6O$]$CH_2CF_3$ | 1,752 |
| 165 | $F_3CH_2CO$[$C_4H_8O$]$_{25}$[$C_3H_6O$]$CH_2CF_3$ | 2,040 |

EXAMPLE 166

PBO 503 is a polybutylene glycol having a molecular weight of 503 and a viscosity of 45 centistokes at 37° C. The procedure of Example 7 was repeated with 15 percent by weight polybutylene glycol and the miscibility was $-1°$ to $>+65°$ C.

The polybutylene glycol is combined with each of the following known lubricants: mineral oil and alkyl benzene. Each mixture remains clear and is one phase.

EXAMPLE 167

A refrigeration system being converted to R134a contains residual mineral oil. R134a and the polybutylene glycol of Example 166 are added to the refrigeration system. The mineral oil dissolved in the polybutylene glycol and the polybutylene glycol dissolved in the R134a travel around the refrigeration loop and return with the R134a to the compressor.

EXAMPLE 168-225

A refrigeration system being converted to R134a contains residual mineral oil. R134a and each lubricant of Examples 1-6 and 8-59 are added to the refrigeration system. The mineral oil dissolved in each lubricant and the lubricant dissolved in the R134a travel around the refrigeration loop and return with the R134a to the compressor.

EXAMPLE 226

Polybutylene glycol having a viscosity of 70 centistokes at 40° C. was mixed with 5 and 50 weight percent R134a. The mixtures were miscible from 0° C. to above 60° C.

EXAMPLE 227

Polybutylene glycol having a viscosity of 98 centistokes at 40° C. was mixed with up to 30 weight percent mineral oil. These mixtures were miscible at room temperature.

EXAMPLE 228

Polybutylene glycol having a viscosity of 70 centistokes at 40° C. was mixed with 5 weight percent mineral oil. 15.2 weight percent R134a was then added to this mixture. This mixture was miscible from 0° C. to above room temperature.

EXAMPLE 229

Polybutylene glycol is mixed with mineral oil and R22. The mixture is miscible from at least 0° C. at above 50° C.

EXAMPLE 230

A rig to simulate the operation of an automobile system was built from the appropriate components. The rig was charged with R12 and mineral oil. The concentration of mineral oil in the liquid line was a measure of the oil circulation. This was measured to be 2 to 4 weight percent. The rig was then charged with R134a and polybutylene glycol. The polybutylene glycol contained up to 10 weight percent mineral oil. The oil circulation was then measured and found to be comparable to that of the R12/mineral oil system. Additionally, the system ran with no problems.

Having described the invention in detail and by reference to preferred embodiments thereof, it will be apparent that modifications and variations are possible without departing from the scope of the invention defined in the appended claims.

What is claimed is:

1. A composition for use in compression refrigeration and air-conditioning comprising:
    (a) at least one refrigerant selected from the group consisting of hydrofluorocarbon, hydrochlorofluorocarbon, fluorocarbon, and chlorofluorocarbon; and
    (b) at least one polyoxyalkylene glycol selected from the group consisting of polyoxyalkylene glycol which is at least difunctional with respect in hydroxyl groups and other polyoxyalkylene glycols having at least one alkyl cap on one end thereof; wherein said polyoxyalkylene glycol has a molecular weight of about 300 to about 4,000, has a viscosity of about 5 to about 150 centistokes at 37° C., and is made from alkylene oxide having at least 4 carbon atoms; and
    (c) a lubricant selected from the group consisting of mineral oil, alkyl benzene, and ester.

2. The composition of claim 1 wherein said refrigerant is chlorofluorocarbon.

3. The composition of claim 1 wherein said refrigerant is dichlorodifluoromethane.

4. The composition of claim 1 wherein said refrigerant is hydrochlorofluorocarbon.

5. The composition of claim 1 wherein said refrigerant is chlorodifluoromethane.

6. The composition of claim 1 wherein said refrigerant is hydrofluorocarbon.

7. The composition of claim 1 wherein said refrigerant is 1,1,1,2-tetrafluoroethane.

8. The composition of claim 1 wherein said refrigerant is difluoromethane.

9. The composition of claim 1 wherein said polyoxyalkylene glycol is polyoxyalkylene glycol which is at least difunctional with respect to hydroxyl groups.

10. The composition of claim 1 wherein said polyoxyalkylene glycol is polyoxyalkylene glycol having an alkyl cap on one end thereof.

11. The composition of claim 1 wherein said polyoxyalkylene glycol is polyoxyalkylene glycol having at least two alkyl caps.

12. The composition of claim 1 wherein said lubricant is mineral oil.

13. The composition of claim 1 wherein said lubricant is alkyl benzene.

14. The composition of claim 1 wherein said lubricant is ester.

15. The composition of claim 1 wherein said polyoxyalkylene glycol is of the formula

$$R_4OR_5[R_6O]_m[R_7O]_nR_8$$

wherein $R_5$ is —$C_pH_{2p}O$— and p is 0 to 4; $R_4$ and $R_8$ are selected independently from the group consisting of hydrogen and alkyl having 1 to 5 carbon atoms; $R_6$ is —$C_aH_{2a}$ and a is 4 to 7; m is 4 to 36; $R_7$ is —$C_bH_{2b}$ and b is 1 to 7; and b is 0 to 36.

16. The composition of claim 15 wherein n is 0 and said $R_4$ and $R_8$ are selected independently from the group consisting of hydrogen and alkyl having 2 carbon atoms.

17. The composition of claim 1 wherein the ratio of said polyoxyalkylene glycol to said lubricant is about 1:99 to about 99:1.

18. A method of substantially removing lubricant from a refrigeration system comprising the steps of:
    (a) adding at least one polyoxyalkylene glycol selected from the group consisting of polyoxyalkylene glycol which is at least difunctional with respect to hydroxyl groups and other polyoxyalkylene glycols having at least one alkyl cap on one end thereof; wherein said polyoxyalkylene glycol has a molecular weight of about 300 to about 4,000, has a viscosity of about 5 to about 150 centistokes at 37° C., and is made from alkylene oxide having at least 4 carbon atoms to said refrigeration system wherein said refrigeration system has chlorofluorocarbon or hydrochlorofluorocarbon refrigerant and said lubricant therein; and
    (b) operating said refrigeration system so as to substantially remove said lubricant therefrom.

19. The method of claim 18 wherein said polyoxyalkylene glycol is polyoxyalkylene glycol which is at least difunctional with respect to hydroxyl groups.

20. The method of claim 18 wherein said polyoxyalkylene glycol is polyoxyalkylene glycol having an alkyl cap on one end thereof.

21. The method of claim 18 wherein said polyoxyalkylene glycol is polyoxyalkylene glycol having at least two alkyl caps.

* * * * *

UNITED STATES PATENT AND TRADEMARK OFFICE
CERTIFICATE OF CORRECTION

PATENT NO. : 5,254,280
DATED : October 19, 1993
INVENTOR(S) : R.P. Thomas, D. Nalewajek, H. Pham and D.P. Wilson It is certified that error appears in the above-indentified patent and that said Letters Patent is hereby corrected as shown below:

<u>Column 18</u>

Please rewrite claim 15 as follows:

15. The composition of claim 1 wherein said polyoxyalkylene glycol is of the formula $$R_4OR_5[R_6O]_m[R_7O]_nR_8$$

wherein $R_5$ is $-C_pH_{2p}O-$ and p is 0 to 4; $R_4$ and $R_8$ are selected independently from the group consisting of hydrogen and alkyl having 1 to 5 carbon atoms; $R_6$ is $-C_aH_{2a}$ and a is 4 to 7; m is 4 to 36; $R_7$ is $-C_bH_{2b}$ and b is 1 to 7; and <u>n</u> [b] is 0 to 36.

Signed and Sealed this

Twenty-third Day of August, 1994

Attest:

BRUCE LEHMAN

*Attesting Officer*     *Commissioner of Patents and Trademarks*